No. 662,373. Patented Nov. 20, 1900.
T. B. DOOLEY.
ANTIFRICTION BEARING.
(Application filed Apr. 24, 1900.)

(No Model.)

Witnesses:
Nathan C. Lombard 2nd
Edward H. Temple

Inventor:
Thomas B. Dooley,
by Lombard & Whitney
Attys.

UNITED STATES PATENT OFFICE.

THOMAS B. DOOLEY, OF MALDEN, MASSACHUSETTS.

ANTIFRICTION-BEARING.

SPECIFICATION forming part of Letters Patent No. 662,373, dated November 20, 1900.

Application filed April 24, 1900. Serial No. 14,077. (No model.)

*To all whom it may concern:*

Be it known that I, THOMAS B. DOOLEY, a citizen of the United States of America, and a resident of Malden, Middlesex county, Massachusetts, have invented certain new and useful Improvements in Antifriction-Bearings, of which the following is a specification.

This invention relates generically to antifriction-bearings, and more specifically to that class of bearings commonly termed "roller-bearings."

An object of the present invention is to furnish an antifriction-bearing of improved, simplified, and efficient construction and organization capable of sustaining heavy loads without misalinement or cramping due to injurious end thrusts, uneven wear, and similar causes found to exist in many bearings of known construction.

A further object of the invention is to provide a bearing especially adapted for use in connection with the wheels of heavy vehicles, such as motor-vehicles, wherein it is desirable to secure a long rolling support for the wheel extending approximately the entire length of the hub and with the least possible friction.

With these objects in view the invention consists in certain details of construction and in the special combination and organization of the several parts of the antifriction-bearing, substantially as hereinafter described and more fully pointed out in the claim.

Figure 1:
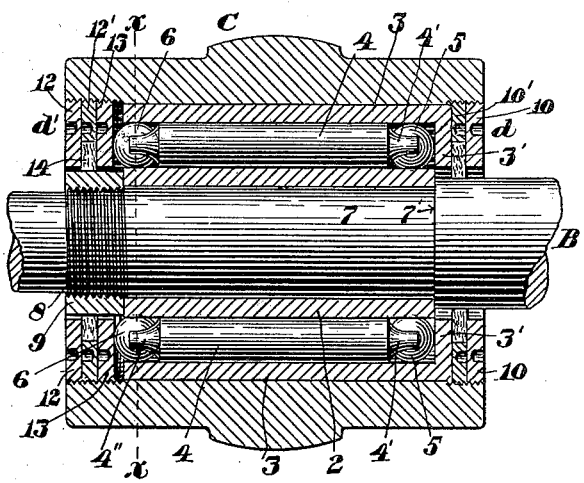
Figure 2:
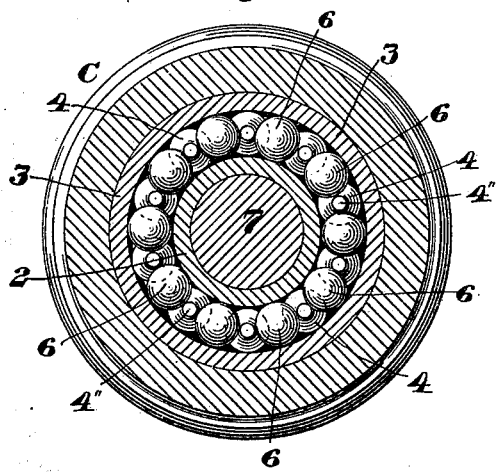

In the drawings accompanying and forming part of this specification, Figure 1 is a central longitudinal section, partly in elevation, of an antifriction-bearing embodying one form of the present invention, a portion only of the shaft or axle being shown; and Fig. 2 is a cross-sectional view of the bearing, taken on a line corresponding to the dotted line *x x* in Fig. 1, as seen from the left in said figure, the balls and rollers being shown in elevation.

Similar characters refer to like parts in both figures of the drawings.

As a preamble to the detailed description of my improved bearing it is desired to state, inasmuch as the same is capable of various applications, that the terms "shaft" and "casing" are employed herein in the abstract and not technically—that is to say, by the term "shaft" as herein employed is meant any centrally-disposed member of an antifriction-bearing, such as a shaft, spindle, axle, or journal of any kind, whether fixed or rotative, and by the term "casing" is meant any form of hollow member, such as a hub, journal-box, or casing, fixed or rotative, surrounding said central member and constituting a casing for the rotative parts of the bearing.

In the preferred construction and organization shown in the accompanying drawings, the antifriction-bearing comprises, as a whole, a shaft or axle, (designated in a general way by B;) a cylindrical casing C, surrounding said shaft and of an internal diameter considerably greater than the diameter of the shaft; two concentrically-disposed tubular sleeves 2 and 3, secured, respectively, to the exterior of the shaft and the interior of the casing and forming between them an annular raceway having opposing bearing-faces which are parallel to each other and to the longitudinal axis of the shaft; a circuit or plural number of elongated cylindrical rollers (each designated by 4) disposed between and in bearing engagement with the adjacent faces of the two sleeves 2 and 3 and having diametrically-reduced conical ends, as hereinafter described; two sets of balls 5 and 6, disposed circumferentially about opposite ends of the sleeve 2 in alternating disposition with respect to and located between the ends of the rollers, and dust-proof confining or retaining means (designated in a general way by $d$ and $d'$, respectively) in adjustable connection with opposite ends of the casing C.

The shaft B, which may be of any suitable or desired form, is shown as having a diametrically-reduced journal proper, 7, which forms a shoulder at 7', against which one end of the sleeve 2 abuts, and is shown as having, further, a reduced and screw-threaded end 8 to receive a nut 9, adapted to bear against the opposite end of said sleeve 2.

If the journal-bearing is to be used in connection with a wheel, the central member B (referred to as the "shaft") will constitute the axle of the wheel and the surrounding member C (referred to as the "casing") will constitute the hub of said wheel.

The casing C is shown in the drawings as a cylinder of substantially uniform diameter from end to end and being of somewhat enlarged external diameter near the central portion thereof; but it will be obvious that the invention is not limited to any particular external form of casing, as this may be modified to meet requirements. This cylinder is also shown internally screw-threaded at opposite ends to receive the confining means $d$ and $d'$.

The sleeve 2 is shown symmetrical from end to end and of a length somewhat less than the length of the casing C, the inner and outer faces of said sleeve being parallel to the axis of the shaft B, and the sleeve 3 is shown having its inner and outer faces parallel to the outer face of the sleeve 2, the inner face of said sleeve 3 being of a length corresponding, substantially, to the length of the sleeve 2 and having at that end thereof in juxtaposition to the shoulder 7' of the shaft an internally-projecting annular flange 3', forming a runway for one set of balls, as 5.

The confining means $d$ in connection with one end of the casing C is shown as comprising two confining-rings 10 and 10', screwed into the end of the cylinder, the inner ring 10' of which is shown of less internal diameter than the outer ring 10, and a dust-guard or packing disposed between the inner edge of the ring 10' and the periphery of the shaft B and between the inner face of said ring 10 and the outer face of the flange 3' on the sleeve 3. The confining means $d'$ consist in the form shown of two rings 12 and 12', corresponding to the rings 10 and 10' and screwed into the opposite end of the casing C in the same manner as are the rings 10 and 10', a bearing or take-up ring 13, screwed into this end of the casing, with its inner face in juxtaposition to the adjacent end of the sleeve 3, to form a runway for the other circuit of balls, as 6, and a dust-guard or packing 14, disposed between adjacent faces of the rings 12 and 13 and surrounding the central portion of the periphery of the nut 9.

It will be obvious that the invention is not limited to the specific construction and organization of confining means as above described and as shown in Fig. 1 of the drawings, as these may be modified within certain limits without departure from this invention.

The rollers 4, which are shown disposed between and in bearing engagement with adjacent faces of the sleeves 2 and 3, are of elongated cylindrical construction and have their opposite ends 4' and 4" preferably reduced and tapered on conical lines to fit between adjacent faces of adjacent balls of the two circuits of balls 5 and 6, and the balls and rollers are so located within the space between the two sleeves that the ends of the rollers terminate within the peripheral lines of the balls or at points substantially in the plane of the centers of the two circuits of balls, and the axes of said rollers substantially intersect the center of said balls, and the balls and rollers are further so disposed relatively that they constitute separators for one another, the balls being located at opposite ends of the roller-chamber between the two sleeves 2 and 3 in alternating disposition with respect to and between the conical ends of said rollers, as will be readily understood by reference to Fig. 2 of the drawings. Furthermore, said balls are each of substantially the same diameter as the diameter of each roller and have a bearing against adjacent faces of the two sleeves 2 and 3. The ends 4' and 4" of the rollers are so formed with respect to the form of the balls that said balls will take up or receive the end thrust of the rollers and will hold said rollers central with relation to the bearing-faces of the sleeves 2 and 3.

To take up any wear between the rollers and balls, it is simply necessary to screw the ring 13 inward and adjust the rings 12 and 12' accordingly, all of the wear being taken up in the form of bearing shown in the drawings by the adjustment of the confining means $d'$ at one end of the casing, which includes the rings 12, 12', and 13.

By the above-described construction and organization of parts an antifriction-bearing is produced which will sustain heavy loads without injury to the true running of the rolling elements thereof and one which may be quickly assembled and disassembled and which will be practically dust-proof.

I claim—

A roller-bearing consisting of a shaft having a shoulder; a casing surrounding said shaft; two concentrically-disposed tubular sleeves fixed respectively to the exterior of the shaft and the interior of the casing and forming between them a symmetrical annular raceway having opposing bearing-faces parallel to each other and parallel to the axis of the shaft, and the inner sleeve of which abuts at one end against the shaft-shoulder and the outer sleeve of which has at one end thereof an internal annular flange; a take-up ring screwed into the casing and having its inner face in juxtaposition to the non-flanged end of the external sleeve; two independent circuits of relatively separated balls located, respectively, in opposite ends of the raceway, and one circuit of balls having bearings against the inner face of the flange and opposing faces of the two sleeves, and the other set of balls having bearings against the inner face of the take-up ring and the opposing faces of the two sleeves, a circuit of relatively separated cylindrical rollers having bearings against opposing faces of the two sleeves and having reduced conical ends fitting between adjacent balls of the two circuits of balls and terminating within the peripheral lines of said balls, and retaining said balls in separated relation and with their peripheries in bearing contact with the flange and take-up ring respectively; confining-rings screwed into opposite ends of the casing; and two dust-guards one of which is interposed between the confining-ring and the take-up ring at one end of the casing, and the other of which is interposed between the confining-ring and sleeve-flange at the other end of the casing substantially as described.

Signed by me at Boston, Massachusetts, this 20th day of April, 1900.

THOMAS B. DOOLEY.

Witnesses:
WALTER E. LOMBARD,
EDWARD H. TEMPLE.